United States Patent Office 3,514,470
Patented May 26, 1970

3,514,470
1,3-OXAZETIDIN-2-ONES
Raymond J. Shozda, Wilmington, Del., assignor to E. I.
du Pont de Nemours and Company, Wilmington, Del.,
a corporation of Delaware
No Drawing. Filed Mar. 1, 1967, Ser. No. 619,558
Int. Cl. C07d 85/04
U.S. Cl. 260—333                                    20 Claims

ABSTRACT OF THE DISCLOSURE

This invention relates to new substituted 1,3-oxazetidin-2-ones, a process for their manufacture from ketones and isocyanates or azides, and their use as cocatalysts in the polymerization of lactams.

BACKGROUND OF THE INVENTION

The polymerization of lactams to polylactams, particularly caprolactam to give 6-nylon, a polyamide, has been known for many years. The earliest processes for this polymerization were slow, requiring several hours, and involved the use of water or acidic reagents as polymerization catalysts. Subsequent work showed that anhydrous lactams could be polymerized in the presence of strongly basic materials, particularly the alkali and alkaline earth metals, their hydrides, hydroxides, alkoxides, oxides, alkyls or amides. More recently, it has been found that the base-catalyzed polymerization of lactams, for example caprolactam, can be made especially fast by the addition of certain compounds which function as cocatalysts or polymerization promoters. Some effective cocatalysts include acylating agents and acyl compounds, for example, acyl halides, anhydrides, imides, organic isocyanates, ketenes, and substituted ureas.

SUMMARY OF THE INVENTION

The instant invention provides a novel class of chemical compounds which, inter alia, are useful as cocatalysts in the aforementioned polymerization of lactams.

The compounds of the instant invention are substituted 1,3-oxazetidin-2-ones of the general formula:

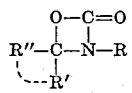

wherein R is an organic radical of from 1–12 carbon atoms and R' and R" can be the same or different, and are independently selected from alkyl radicals of 1 to 4 carbon atoms and, taken together, as R'R" form polymethylene diradicals of 3 to 5 carbon atoms, said radicals R' and R" having at least half of their hydrogen atoms replaced by one or more halogens selected from F, Cl, and Br. The compounds of the invention are prepared by contacting at least one of the group consisting of isocyanates having the formula RNCO and acyl azides having the formula $RCON_3$ with a ketone having the formula R'—CO—R", in which R, R', and R" are as defined above. This invention also provides an improvement in the process for promoted anionic polymerization of lactams, said improvement comprising the use of the compounds of the instant invention as cocatalysts.

DESCRIPTION OF THE PREFERRED EMBODIMENTS

As indicated above, the novel compounds of the instant invention are prepared by contacting a ketone having groups R" and R' with an isocyanate or acyl azide having a group R.

The ketones which can be used in the process of the present invention preferably have a large number of electronegative substituents on the R' and R" groups. These exert the strongly electron-withdrawing character that activates the C=O group for the addition reaction. Preferably at least half of the hydrogens in the ketones are replaced by at least one of the halogens selected from F, Cl, and Br. Especially preferred are ketones fully halogenated with F and Cl atoms.

Ketones which can be used in the process of the instant invention include, for example, sym-tetrafluoroacetone; fully halogenated ketones wherein R' and R" both contain 1 carbon atom, for example, hexafluoroacetone, pentafluorobromoacetone, pentafluorochloroacetone, bis-(chlorodifluoromethyl)ketone, 1,1,3 - trichloro-1,3,3-trifluoropropan-2-one; those wherein R and R' both contain 2 carbon atoms, for example, decafluoropentan-3-one and 1,1,2,4,5 - pentachloro - 1,2,4,5,5 - pentafluoropentan-3-one; 1,1,2,4,5,6,6-heptachlorohexan - 3 - one; octafluorobutan - 2 - one; 1,1,1,3,3 - pentafluoro-3-bromopropan-2-one; dodecafluorohexan - 2 - one; and perfluorocyclobutanone.

Isocyanates which can be used in the process of this invention have the general formula R—N=C=O, wherein R is an organic radical of from 1–12 carbon atoms. It is preferred that R be composed of atoms selected from carbon and at least one of hydrogen, nitrogen, oxygen and halogens. Such isocyanates can include, for example, those wherein R is a saturated hydrocarbon radical, such as alkyl isocyanates, e.g., methyl isocyanate, n-butyl isocyanate, n-dodecyl isocyanate, ethyl isocyanate, n-propyl isocyanate, isopropyl isocyanate, n-amyl isocyanate, isoamyl isocyanate, and isooctyl isocyanate; such as a halogen-substituted hydrocarbon radical, e.g., 1,2-dichloroethyl isocyanate and 3-bromopropyl isocyanate; such as a cycloalkyl radical, e.g., cyclohexyl isocyanate, cyclopentyl isocyanate, cyclobutyl isocyanate; those wherein R is an unsaturated hydrocarbon radical, such as alkenyl isocyanates, e.g., allyl isocyanate and methallyl isocyanate; such as cycloalkenyl isocyanates, e.g., cyclohexen-2-yl isocyanate and cyclobuten-2-yl isocyanate; such as aralkyl isocyanates, e.g., benzyl isocyanate; those wherein R is a carboalkoxy substituted alkyl group, for example, ethyl carboxymethyl isocyanate and butyl carboxymethyl isocyanate; those wherein R is a cyanoalkyl radical such as cyanomethyl isocyanate and cyano ethyl isocyanate; and those wherein R is a dialkyl amino alkyl radical such as dimethyl amino methyl isocyanate and dimethyl amino ethyl isocyanate. Acyl azides also can be used, instead of the isocyanates, since azides readily decompose to the corresponding isocyanates. Azides which can be used in this invention include, therefore, acyl azides having the formula $RCON_3$ in which R is as defined above.

A catalyst can be used in the process of the instant invention. Catalysts preferred in this process include, for example, Lewis acids such as $BF_3$, $AlCl_3$, $FeCl_3$, and $SbCl_5$, and Lewis bases such as fluorides of the elements of groups Ia and IIa of the Periodic Table of the Elements appearing in Handbook of Chemistry & Physics, 40th edition, p. 448. Of these, cesium fluoride and boron trifluoride are especially preferred. While the amount of catalyst used is not critical to this invention, a quantity of catalyst equal to 0.001 to 5% of the combined weights of the reactants, and especially .01 to 5%, is preferred.

A solvent can be used as a reaction medium for the process of the invention. The solvent can be any liquid which is anhydrous and chemically inert toward the reactants of the process. Use of a solvent is preferred because it facilitates temperature control during reaction and removal of reaction products from the reactor. Suitable solvents include, for example, liquid $SO_2$ and polyhalogenated hydrocarbons such as carbon tetrachloride, methylene chloride, dichlorodifluoromethane, trichlorofluoromethane, and dibromotetrafluoroethane. Of these, $SO_2$ is especially preferred. The quantity of solvent used is not a critical feature of the instant invention; however, when a solvent is used it is preferred that the ratio of the weight of solvent to the total weight of reactants is about from 3:2 to 2:3, and a ratio of about 1:1 is especially preferred.

The reaction temperature can vary from 0° to 200° C., depending upon the particular reactants used and the rate of their combination. Control of the reaction temperature is facilitated by the use of a solvent in the reaction mixture.

The reaction pressure generally is the autogenous pressure of the reaction mixture in a closed vessel at the chosen temperature. If a low boiling reactant or solvent is employed, the system can be pressurized with $N_2$ or other inert gas up to about 150 p.s.i.g. before bringing the mixture to reaction temperature.

The compounds of the instant invention, in addition to their utility as cocatalysts for the polymerization of lactams, are useful as solvents, and as polymer intermediates. For example, one group of compounds of this invention useful as polymer intermediates is that group of compounds containing an unsaturated R substituent, e.g., an allyl group. This substituent permits homo-polymerization or permits catalyzed copolymerization of said compound with another unsaturated compound such as ethylene.

In the following examples, which further illustrate the instant invention, parts and percentages are by weight unless otherwise noted.

Example 1

A stainless steel autoclave with a stirrer is charged with 60 parts of methylisocyanate, 200 parts (about 15% excess) of hexafluoroacetone, and is pressured with $N_2$ gas to 100 p.s.i.g. The mixture is stirred and heated at about 100° C. for 8 hours. The maximum pressure is about 350 p.s.i.g. The reaction mixture is cooled, transferred to distillation equipment, and fractionated at reduced pressure, collecting the fraction condensing at −45°/0.5 mm. The product weighs 60 parts, which represents a 25.6% conversion of the methyl isocyanate to, and a 59% yield of, 3 - methyl - 4,4-bis(trifluoromethyl)-1,3-oxazetidin-2-one; density=1.53 g./ml., B.P.=102° C.

The product is identified by: IR spectrum: C=O doublet at 1890–1935 cm.$^{-1}$. Mass spectrum: m/e (ion), 223 (parent), 178 $((CF_3)_2C=NCH_2^+)$,

154($CH_3NC(CF_3)OC=O^+$)

126 ($CF_3CONCH_3^+$), 110 ($CF_3CNCH_3^+$)

97 ($CF_3CO$), 69 ($CF_3^+$), 57 ($CH_3NCO^+$)

56 ($CH_2NCO^+$), 50 ($CF_4^+$), 44 ($CO_2^+$), and other peaks consistent with the structure. $F^{19}$ NMR spectrum: quartet at +4360 cps. $H^1$ NMR spectrum: septet at −183 cps. $J_{HF}$=0.6 cps. $H^1$ NMR spectra were determined at 60 mc. with tetramethylsilane as an internal standard, and $F^{19}$ spectra were measured at 56.4 mc. with $CFCl_3$ as an internal standard.

Analysis.—Calcd. for $C_5H_3F_6NO_2$ (percent): C, 26.93; H, 1.36; F, 51.12; N, 6.28. Found (percent): C, 27.06; H, 1.36; F, 48.58; N, 6.39.

In a similar manner, 50 g. of hexafluoroacetone and 20 g. of methylisocyanate are combined and reacted by heating the charge for 1 hr. at 60° C. and then 1.5 hr. at 100° C., whereupon a 16% conversion to the 1,3-oxazetidin-one is obtained.

Example 2

A mixture of 0.1 part CsF, 10 parts methyl isocyanate, and 30 parts hexafluoroacetone is pressured with 100 p.s.i.g. nitrogen in a glass pressure reactor and stirred for 8 hours at 94–96° C. Workup as in Example 1 gives 18.9 parts (48.5% conversion) of 3-methyl-4,4-bis(trifluoromethyl)-1,3-oxazetidin-2-one.

Example 3

A mixture of 15 parts hexafluoroacetone, 5 parts $CH_3NCO$, and 25 parts $SO_2$ in a glass reactor at −196° C. is pressured with 100 p.s.i.g. $N_2$. The mixture is warmed to 100° and stirred for 8 hrs. The maximum pressure is 400 p.s.i.g. Workup gives 12.0 parts (61% conversion) of 3 - methyl - 4,4 - bis(trifluoromethyl)-1,3-oxazetidin-2-one.

In a like manner, if the foregoing example is repeated using 1,1,1,3,3-pentafluoro-3-bromo-propan-2-one instead of the hexafluoroacetone, 3-methyl-4-trifluoromethyl-4-difluorobromomethyl-1,3-oxazetidin-2-one is obtained as the product.

Example 4

A mixture of 30 parts hexafluoroacetone, 10 parts $CH_3NCO$, and 0.075 part of $BF_3 \cdot Et_2O$ is reacted at 80° C. as described in Example 2. The maximum pressure in the reactor is 230 pounds, and the reaction yields 17.2 parts (43.8% conversion) of 3-methyl-4,4-bis(trifluoromethyl)-1,3-oxazetidin-2-one.

In a like manner, if the foregoing example is repeated using carboethoxymethyl isocyanate instead of methyl isocyanate, the product obtained is 3-carboethoxymethyl-4,4-bis(trifluoromethyl)-1,3-oxazetidin-2-one.

Example 5

A mixture of 30 parts of chloropentafluoroacetone and 10 parts of methyl isocyanate in a glass reactor is pressured with 100 p.s.i.g. of dry $N_2$. The mixture is stirred and heated at 80° C. for 8 hr. The maximum pressure developed is 135 p.s.i.g. The reactor is cooled to −30° C., vented, and connected to a vacuum line. The reactor is warmed to room temperature as the contents are distilled through a −45° trap into a −196° trap. The −45° trap contains 6.5 parts (16.2% yield) of a clear liquid which vapor phase chromatographic (VPC) analysis shows to be 98% pure 3-methyl-4-trifluoromethyl-4-difluorochloromethyl - 1,3 - oxazetidin-2-one. An analytical sample is purified by vapor phase chromatography; B.P., 135° C., as determined by differential thermal analysis (DTA); density, 1.50 g./ml.

Analysis.—Calcd. for $C_5H_3ClF_5NO_2$ (percent): C, 25.07; H, 1.27; Cl, 14.81; F, 39.67; N, 5.85. Found (percent): C, 24.84; H, 1.26; Cl, 14.58; F, 40.00; N, 5.95.

Mass spectrum: m/e (ion), 239 (parent), 176 ($CF_3COCF_2Cl^+$), 126 ($CF_3CONCH_3^+$)

110 ($CF_3CNCH_3^+$), 97 ($CF_3CO^+$), 85 ($ClCF_2C^+$)

69 ($CF_3^+$), 57 ($CH_3NCO^+$), 56 ($CH_2NCO^+$), 51 ($CF_2^+$)

44 ($CO_2^+$), and other peaks, including those due to Cl isotopes, consistent with the structure: 3-methyl-4-chlorodifluoromethyl-4-trifluoromethyl-1,3-oxazetidin-2-one.

The $F^{19}$ spectrum shows $CF_3$ resonance as a triplet centered at +4224 cps., with $J_{FF}$ of 9.6 cps. The $CF_2$ resonance is comprised of two overlapping quartets centered at +3585 cps., and confirms the presence of an asymmetric carbon atom. The splitting within each quartet is 9.6 cps. The parent ketone has a spectrum with a normal quartet centered at 3776.2 cps. and a triplet centered at 4159 cps.

The infrared spectrum (liquid) is consistent with the formula indicated above and displays the characteristic absorption of the strained ring carbonyl group as a doublet at 1890–1926 cm.$^{-1}$.

In a like manner, if the foregoing example is repeated using allyl isocyanate instead of methyl isocyanate, the resulting product is 3-allyl-4-chlorodifluoromethyl-4-trifluoromethyl-1,3-oxazetidin-2-one.

Example 6

A mixture of 20 parts of 1,3-dichlorotetrafluoroacetone and 20 parts of methyl isocyanate is pressured to 100 p.s.i.g. with $N_2$ in a glass reactor. The mixture is stirred and heated to 100° C. for 8 hr. Workup as described above yields 2.7 parts (10.5%) of 96% pure product, 3-methyl-4,4-bis(chlorodifluoromethyl)-1,3-oxazetidin-2-one. Purification by vapor phase chromatography over a silicon oil 550 column gives an analytical sample; B.P., 154° (DTA); density, 1.55 g./ml.

*Analysis.*—Calcd. for $C_5H_3Cl_2F_4NO_2$ (percent): C, 23.46; H, 1.18; Cl, 27.70; F, 29.69; N, 5.47. Found (percent): C, 23.80; H, 1.21; Cl, 27.51; F, 28.36; N, 5.65.

Mass spectrum: m/e (ion), 255 (parent), 126 ($ClCF_2CNCH_3^+$), 85 ($ClCF_2^+$), 57 ($CH_3NCO^+$), 56 ($CH_2NCO^+$), 50 ($CF_2^+$), 44 ($CO_2^+$). Other peaks appear at m/e 175, 169, 135, 114, 106, 78, 76, 40, 35, 31, 29, 28, and 15. The expected Cl isotope peaks are also observed. The data confirms the identity of the product as 3-methyl-4-bis(chlorodifluoromethyl)-1,3-oxazetidin-2-one.

The proton NMR spectrum consists of a closely spaced 5-line pattern at −183 cps. with spacings of 0.6–0.8 cps. The $F^{19}$ NMR showed an incompletely resolved multiplet at 3426.5 cps.

The infrared spectrum has the characteristic carbonyl absorption at 1885 and 1918 cm.$^{-1}$.

In a like manner, if the foregoing example is repeated using cyclohexyl isocyanate instead of methyl isocyanate, the resulting product is 3-cyclohexyl-4,4-bis(chlorodifluoromethyl)-1,3-oxazetidin-1,2-one.

Example 7

A mixture of 30 parts of 1,3,3-trichlorotrifluoroacetone and 20 parts of methyl isocyanate is pressured to 100 p.s.i.g. with $N_2$ and is then stirred and heated for 8 hr. at 100° C. Workup as described above transfers the unreacted isocyanate to the −196° trap and the unreacted ketone to the −45° trap, leaving 1.1 g. of a pasty white solid containing the expected product,

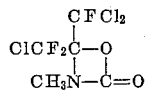

and another compound having an infrared absorption at 5.95μ. The mixture is filtered with the aid of a rubber dam to give a viscous yellow liquid. Distillation of the liquid under high vacuum with a modified Hickman still gives 0.6 part of a liquid which contains over 50% of the expected product mixed with the 5.95μ compound.

This material is analyzed by nuclear magnetic resonance procedures. The parent ketone has an $F^{19}$ spectrum in which the $CF_2$ resonance is a doublet at 3505 and 3517.4 cps., and the CF group is a triplet centered at 3925 cps. The CF resonance of the purified reaction product, however, appears as a triplet centered at 3606 cps. ($J_{FF}$ 14.2 cps.). The $CF_2$ lines are of nearly equal size and fall at 3210.2, 3217.7, 3222.4, and 3231.9 cps. The remainder of these two superimposed AB patterns, caused by the asymmetric carbon atom, is lost among peaks due to impurities.

The proton NMR indicates a mixture, but the largest peak falls at −185 cps. which is in the range observed for the preceding oxazetidinones.

The infrared spectrum of the product mixture has a peak at 1870 cm.$^{-1}$ and affirms the presence of the product indicated above.

In a like manner, if the foregoing example is repeated using benzyl isocyanate instead of the methyl isocyanate, the resulting product is 3-benzyl-4-difluorochloromethyl-4-chlorodifluoromethyl-1,3-oxazetidin-2-one.

Example 8

Six parts of perfluorocyclobutanone and 10 parts of methyl isocyanate are pressured with 5 p.s.i.g. of $N_2$ and are then stirred and heated at 80° C. for 8 hr. in a glass reactor. The mixture is cooled to −30°, vented, and then opened to a −45° trap backed up by a −196° trap. Gas chromatography of the reactor residue shows the presence of only one volatile compound (69.6% yield). The product sublimes easily; 3.6 parts of a sublimed analytical sample is collected from a −80° trap; M.P., 52–53°. It is identified as 3-methyl-5,5,6,6,7,7-hexafluoro-1-oxa-3-azaspiro[3,3]heptan-2-one.

*Analysis.*—Calcd. for $C_6H_3F_6NO_2$ (percent): C, 30.65; H, 1.29; F, 48.49; N, 5.96. Found (percent): C, 30.45; H, 1.17; F, 48.9; N, 6.11.

The $F^{19}$ NMR has multiplets at +7271 and 7295.2 cps. which are assigned to the 5 and 7 C-F bonds. Another more complex multiplet is centered at +7632 cps. and is assigned to the $CF_2$ at the 6-position. The proton spectrum has a peak at −188 cps.

The infrared spectrum ($CHCl_3$) has bands characteristic of a 1,3-oxazetidinone as a doublet at 1873 and 1897 cm.$^{-1}$.

In a like manner, if the foregoing example is repeated using cyanomethyl isocyanate instead of methyl isocyanate the resulting product is 3-cyanomethyl-5,5,6,6,7,7-hexafluoro-1-oxa-3-azaspiro[3,3]heptan-2-one.

Example 9

A mixture of 40 parts of hexafluoroacetone, 20 parts of n-butyl isocyanate, and .056 part of $BF_3$·etherate is pressured to 100 p.s.i.g. with $N_2$ and stirred and heated at 75° C. for 8 hr. Workup as described above gives 22.7 parts of a mixture from which an analytical sample is collected (97% pure); B.P., 161° (DTA); approximate density, 1.5 g./ml., and identified as 3-n-butyl-4,4-bis(trifluoromethyl)-1,3-oxazetidin-2-one.

*Analysis.*—Calcd. for $C_8H_9F_6NO_2$ (percent): C, 36-24; H, 4.42; F, 42.99; N, 5.29. Found (percent): C, 36.60; H, 3.53; F, 42.38; N, 5.35.

The $F^{19}$ nuclear magnetic resonance spectrum (NMR) has a multiplet at 4359 cps. The proton NMR shows the expected pattern, similar to that of n-butyl isocyanate.

The infrared spectrum shows the characteristic peak for the oxazetidinone at 1898 cm.$^{-1}$.

In a like manner, if the foregoing example is repeated using dimethylaminomethyl isocyanate instead of n-butyl isocyanate the resulting product is 3-dimethylaminomethyl-4,4-bis(trifluoromethyl)1,3-oxazetidin-2-one.

Example 10

A mixture of 0.65 part acetyl azide, 2.4 parts hexafluoroacetone, and 12.1 parts of sulfur dioxide is stirred in a pressure flask overnight at room temperature. Workup by fractional distillation as in Example 1 yields 0.15 part of 3-methyl-4,4-bis(trifluoromethyl)-1,3-oxazetidin-2-one.

Example 11.—Anionic polymerization of lactams

A mixture of 11.2 parts of substantially anhydrous ε-caprolactam and 9 mole percent (based on the lactam) of sodium hydride in a reaction tube held in a bath at about 150° C. is sparged with nitrogen gas for about 20 minutes. A mixture of 11.2 parts of anhydrous ε-caprolactam and 0.8 mole percent (based on lactam) of 3-methyl-4,4-bis(trifluoromethyl)-1,3-oxazetidin-2-one is brought to 150° C. and quickly transferred to, and mixed with, the contents of the first tube. The progress of the polymerization is observed visually, noting the time from addition of the oxazetidinone (cocatalyst) to the time at which no perceptible flow of the melt occurs when the reaction tube is held at a 45° angle. This is the "no-flow" time commonly recognized in the art, and in this instance is 30 seconds at the 150° C. reaction temperature. The overall usage of catalyst is 4.5 mole percent and of cocatalyst is 0.4% based on total weight of lactam being polymerized.

I claim:
1. 1,3-oxazetidin-2-ones of the general formula:

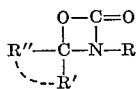

wherein R is an organic radical selected from the group consisting of alkyl, alkenyl, aralkyl, cycloalkyl, cycloalkenyl, carboalkoxyalkyl, cyanoalkyl and dialkylaminoalkyl of from 1–12 carbon atoms and R' and R" are independently selected from alkyl radicals of 1 to 4 carbon atoms and, taken together, as R'R", form polymethylene diradicals of 3 to 5 carbon atoms, said radicals R' and R" having at least half of their hydrogen atoms replaced by at least one halogen selected from F, Cl, and Br.

2. A compound of claim 1 wherein R is hydrocarbon.
3. A compound of claim 2 wherein R is alkyl.
4. The compound of claim 3 wherein R is $CH_3$ and R' and R" are $CF_3$.
5. A compound of claim 3 wherein R is $CH_3$, R' is $CF_3$, and R" is $CF_2Cl$.
6. A compound of claim 3 wherein R is $CH_3$, and R' and R" are $CF_2Cl$.
7. A compound of claim 3 wherein R is $CH_3$, and R' and R" together are $-CF_2CF_2CF_2-$.
8. A compound of claim 3 wherein R is n-butyl and R' and R" are both $CF_3$.
9. A compound of claim 2 wherein R is aralkyl.
10. A compound of claim 2 wherein R is cycloalkyl.
11. A compound of claim 1 wherein R is carboalkoxyalkyl.
12. A compound of claim 1 wherein R is cyanoalkyl.
13. A compound of claim 1 wherein R is dialkylaminoalkyl.
14. A process for making compounds of the general formula:

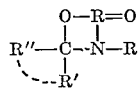

wherein R is an organic radical selected from the group consisting of alkyl, alkenyl, aralkyl, cycloalkyl, cycloalkenyl, carboalkoxyalkyl, cyanoalkyl and dialkylaminoalkyl of from 1–12 carbon atoms and R' and R" are independently selected from alkyl radicals of 1 to 4 carbon atoms and, taken together, as R'R", form polymethylene diradicals of 3 to 5 carbon atoms, said radicals R' and R" having at least half of their hydrogen atoms replaced by at least one halogen selected from F, Cl and Br; which process comprises contacting at least one of the compounds selected from the group consisting of isocyanates of the general formula RNCO and acyl azides of the general formula $RCON_3$ with a ketone having the formula R'—CO—R", wherein R, R', and R" are as defined above.

15. The process of claim 14 wherein said compounds are brought into contact in the presence of a catalyst selected from $BF_3$, $AlCl_3$, $FeCl_3$, $SbCl_5$, and fluorides of the elements of groups Ia and IIa of the Periodic Table.
16. A process of claim 15 wherein said catalyst is $BF_3$.
17. A process of claim 16 wherein said catalyst is CsF.
18. A process of claim 14 wherein said compounds are brought into contact in the presence of an anhydrous liquid solvent compatible with said catalyst and selected from the group consisting of sulfur dioxide and hydrocarbons substituted with at least one halogen selected from chlorine, bromine, and fluorine.
19. A process of claim 18 wherein said solvent is $SO_2$.
20. A process of claim 18 wherein said solvent is $CH_2Cl_2$.

References Cited
UNITED STATES PATENTS

| | | | |
|---|---|---|---|
| 2,723,265 | 11/1955 | Stallmann | 260—239 |
| 3,320,335 | 5/1967 | Hedrick et al. | 260—78 |
| 3,392,199 | 7/1968 | Middleton | 260—566 |

OTHER REFERENCES

Ulrich, Henri, "Cycloaddition Reactions of Heterocumulenes" (1967), pp. 160–165.

NORMA S. MILESTONE, Primary Examiner

U.S. Cl. X.R.

260—78

PO-1050
(5/69)

UNITED STATES PATENT OFFICE
CERTIFICATE OF CORRECTION

Patent No. 3,514,470      Dated May 26, 1970

Inventor(s) Raymond J. Shozda

It is certified that error appears in the above-identified patent and that said Letters Patent are hereby corrected as shown below:

Column 7, lines 37 to 42, the formula should read:

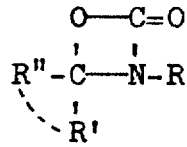

SIGNED AND
SEALED

SEP 29 1970

(SEAL)
Attest:

Edward M. Fletcher, Jr.
Attesting Officer

WILLIAM E. SCHUYLER, JR.
Commissioner of Patents